Feb. 2, 1971 E. F. FINNEMAN 3,560,045
FLEXIBLE COVER POSITIONING APPARATUS
Filed March 21, 1969 2 Sheets-Sheet 1

INVENTOR.
ERWIN F. FINNEMAN
BY Merchant & Gould
ATTORNEYS

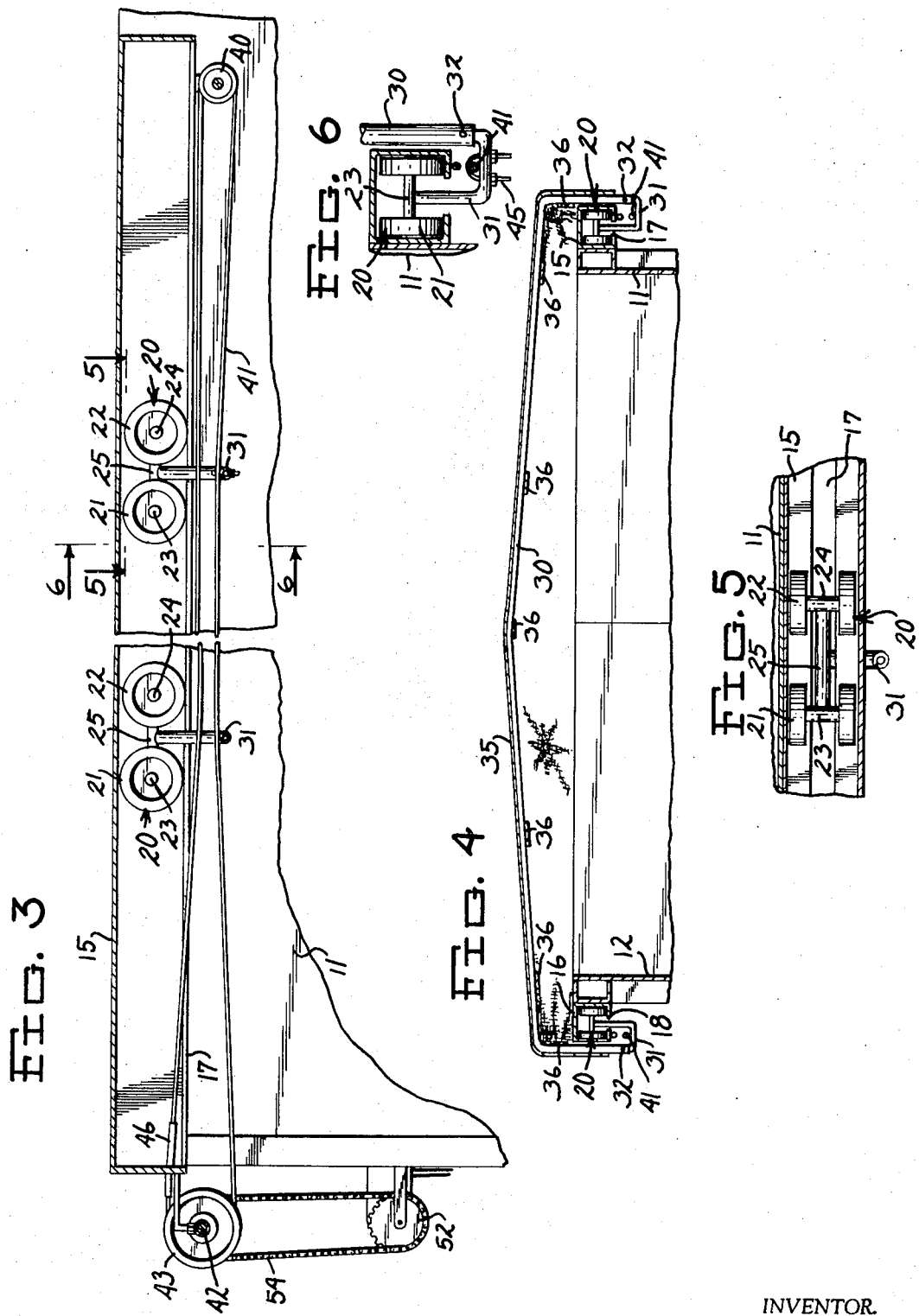

United States Patent Office 3,560,045
Patented Feb. 2, 1971

3,560,045
FLEXIBLE COVER POSITIONING APPARATUS
Erwin F. Finneman, Rte. 1, Box 25,
Anamoose, N. Dak. 58710
Filed Mar. 21, 1969, Ser. No. 809,269
Int. Cl. B60j 7/10
U.S. Cl. 296—137                4 Claims

ABSTRACT OF THE DISCLOSURE

A downwardly opening track affixed to the upper edges of opposed sides of a truck box with a plurality of dollies movably engaged therewith, a plurality of support rods having a flexible cover attached thereto affixed to a dolly at either end thereof, an endless flexible cable mounted by pulley means adjacent each end of at least one of the tracks and affixed to the rear dolly engaged in said track, and an electric motor engaged with the pulley means for moving the endless cable for stretching or retracting said flexible cover over the box.

BACKGROUND OF THE INVENTION

Field of the invention

Many trucks having boxes with open tops are utilized for carrying bulk materials. When carrying these bulk materials a tarpaulin or the like must be stretched over the top of the box to prevent foreign material from mixing therewith, the material from blowing away during the transportation thereof, and possible wetting in the event of rain or the like.

Description of the prior art

In the prior art flexible covers on trucks had to be stretched and retracted by hand or the support rods are simply slid along the top of the truck. This method of stretching and retracting a flexible cover over the top of a truck is extremely laborious and time consuming.

SUMMARY OF THE INVENTION

The present invention pertains to apparatus for positioning a flexible cover over a truck box including first and second tracks attached to the outwardly directed surfaces of opposed sides of the box, a plurality of support rods extending across the box with movable members at both ends thereof engaged in the tracks and endless cable means mounted by pulley means at both ends of at least one of said tracks with means for rotating the same and affixed to the end movable member in said track.

It is an object of this invention to provide new and improved apparatus for positioning a flexible cover over a truck box.

It is a further object of the present invention to provide apparatus for positioning a flexible cover including substanitally enclosed tracks with wheeled dollies mounted therein for ease and reliability in stretching and retracting the flexible cover.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 3 is an enlarged sectional view as seen from the line 3—3 in FIG. 2, portions thereof broken away;

FIG. 4 is an enlarged sectional view as seen from the line 4—4 in FIG. 2, portions thereof broken away;

FIG. 5 is an enlarged detail view in top plan as seen generally from the line 5—5 in FIG. 3;

FIG. 6 is a frgamentary sectional view as seen from the line 6—6 in FIG. 3; and

DESCRIPTION OF THE PREFERRED EMBODIMENT

Figure 1:
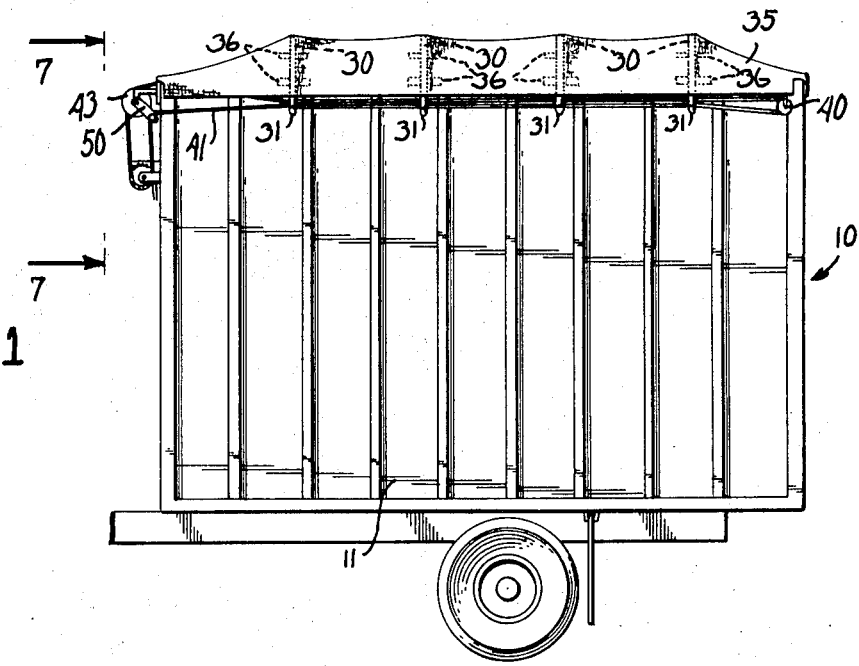
FIG. 1 is a view in side elevation of a truck box with a flexible cover and the present positioning apparatus attached thereto.
Figure 2:
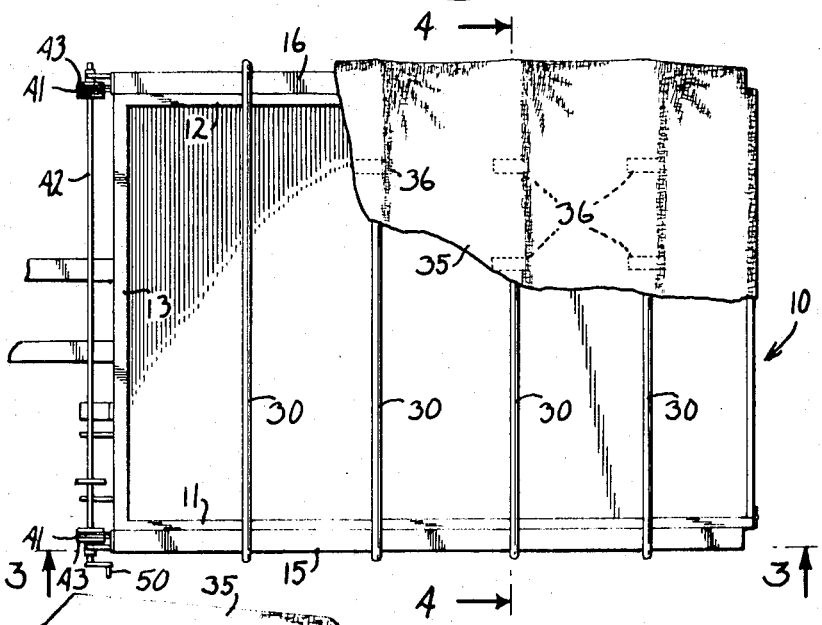
FIG. 2 is a view in top plan of the apparatus illustrated in FIG. 1, portions thereof broken away.

In the figures the numeral 10 generally designates a truck box having vertical, longitudinally extending sides 11 and 12 and a front wall 13. The truck box 10 is the substantially imperforate type open at the top for ease in loading bulk materials, such as grains and the like. It should be understood however that the present truck box 10 is simply for exemplary purposes and the present apparatus could be utilized on many types and varieties of truck boxes.

Affixed to the outwardly directed surfaces of the sides 11 and 12 adjacent the upper edges thereof are tracks 15 and 16. Tracks 15 and 16 each include an elongated tubular member, having a generally rectangular shaped cross-section in this embodiment, with downwardly opening longitudinally extending slots 17 and 18, respectively, in the lower walls thereof. The slots 17 and 18 are approximately in the central portion of the lower wall so that the remainder of the wall forms opposed flanges on either side of each of the slots 17 and 18. The tracks 15 and 16 are affixed to the sides of the truck box 10 in any convenient manner, such as welding, bolting, etc., and extend from adjacent the front end thereof to adjacent the rear end thereof.

Engaged within the tracks 15 and 16 for movement therealong are a plurality of movable members, which in this embodiment are dollies generally designated 20. Each dolly has two sets of wheels 21 and 22 each rotatably mounted at opposite ends of axles 23 and 24, respectively. The axles 23 and 24 are fixed together in parallel spaced apart relationship by means of an elongated bar 25, which serves as the body of the dolly 20. The dollies 20 are engaged in the tracks 15 and 16 so that the sets of wheels 21 and 22 ride on the upwardly directed surfaces of the flanges bordering the slots 17 and 18. In this embodiment the vertical dimension of the opening through the tracks 15 and 16 is slightly greater than the diameter of the sets of wheels 21 and 22 and the horizontal dimension of the opening is slightly greater than the combined width of either axle with a set of wheels thereon, so that the dollies 20 can travel freely in a longitudinal direction along the tracks 15 and 16 but transverse movements are substantially prevented. Thus, the particular configuration of the tracks 15 and 16 maintains the dollies 20 in the desired orientation as well as providing a cover to at least partially prevent dirt, foreign material, etc., from entering the tracks 15 and 16 and hampering the operation of the present apparatus.

A plurality of transversely extending generally U-shaped support rods 30 are positioned over the top of the truck box 10 so as to be spaced somewhat above the upper edges of the sides 11 and 12 and so that the end portions of the rods 30 extend downwardly along the outer sides of and somewhat beyond the tracks 15 and 16. A plurality of generally U-shaped rods 31 each have one end affixed to the bar 25 of a dolly 20 so as to extend downwardly therefrom with the bight of the U-shaped rod 31 extending generally outwardly beneath the track 15 or 16 and the opposite arm extending upwardly along the outside of the track 15 or 16. The upwardly extending arm of each of the rods 31 is affixed to a downwardly extending end portion of a support rod 30 by some convenient means. In the present embodiment the ends of each of the rods 31 telescope into the ends of each of the support rods 30 and a pin 32 through each of these junctions maintains them fixedly engaged. Thus, each of the support rods 30 has a dolly 20 fixedly attached at both ends thereof for longitudinal movements along the truck box 10. Because transverse movements of the dollies 20 is substantially prevented, twisting movements of the support rods 30 are substantially prevented and the support rods 30 are held rigidly in the desired position.

Figure 7:
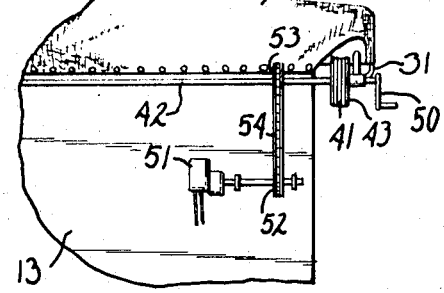
FIG. 7 is a view in front elevation as seen generally from the line 7—7 in FIG. 1, portions thereof broken away.

A tarpaulin, canvas, or similar water-proof flexible cover 35 is preformed to fit the truck box 10 and affixed along the upper edge of the front wall 13 by some convenient means, such as rivets, bolts, etc., (see FIG. 7). The cover 35 is affixed to each of the support rods 30 in a parallel spaced apart relationship, so that the cover 35 overlies the support rods 30 and is supported thereby along its entire length. In this embodiment the cover 35 is affixed to each of the support rods 30 by means of a plurality of patches of material 36 affixed to the cover 35 adjacent either end thereof by means of sewing, glue, etc., and encircling the support rods 30 to maintain them correctly positioned relative to the cover 35.

A first pair of pulleys 40 is affixed to the outer surface of the sides 11 and 12 of the truck box 10 adjacent the rear end thereof and slightly beneath the tracks 15 and 16. The pulleys 40 are mounted for rotation about an axis perpendicular to the longitudinal dimensions of the tracks 15 and 16 and two endless flexible cables 41 are engaged thereover. An elongated rod or axle 42 is rotatably affixed to the front surface of the front wall 13 and extends a short distance outwardly beyond the sides 11 and 12. Two pulleys 43 are affixed adjacent each end of the axle 42 for rotation therewith approximately in alignment with the tracks 15 and 16 but slightly therebelow. The flexible cables 41 are engaged over the pulleys 43 so as to extend tautly between the pulleys 40 and the pulleys 43 on either side of the truck box 10. The lower span of each of the flexible cables 41 extends through the U-shaped rods 31 and is supported by the bights thereof. The U-shaped rods 31 affixed to the last or rearmost dolly 20 engaged in each of the tracks 15 and 16 has a clamp 45 affixed thereto which engages the flexible cable 41 and holds it immovable relative to the last or rearmost dolly 20. Thus, as the flexible cables 41 move, the rearmost dollies 20 in the tracks 15 and 16 are moved therewith. The upper spans of the flexible cables 41 pass through cable guides 46 (tubular members having inner diameters slightly larger than the outer diameter of the cable 41) affixed in the front wall 13, and extend beneath the lower surfaces of the tracks 15 and 16 to the rear pulleys 40.

One end of the axle 42 extends outwardly and is adapted to receive in operating engagement therewith a hand-crank 50. An electric motor 51 affixed to the front surface of the front wall 13 is engaged with the axle 42 for rotation thereof by means of two sprockets 52–53 and a chain 54. The electric motor 51 is adapted to operate from the electrical system of the truck and may be energized by a switch (not shown) within the truck cab. The axle 42 could be rotated by many other means, such as a hydraulic pump and motor, known to those skilled in the art. Thus, as the axle 42 is rotated the flexible cables 41 rotate moving the rearmost dollies 20 and the support rods 30 attached thereto along the tracks 15 and 16. When the dollies 20, support rods 30 and cover 35 are in the retracted position at the front of the truck box 10 clockwise rotation of the flexible cables 41 (as seen in FIG. 3) causes the rearmost dollies 20 and support rod 30 to move rearwardly whereby the cover 35 affixed to each of the other support rods 30 is stretched over the top of the truck box 10. As the cover 35 is stretched over the truck box 10 each of the support rods 30 affixed thereto is moved into its correct position. To retract the cover 35 the rotational direction of the axle 42 is reversed whereby the rotational direction of the flexible cables 41 is reversed and the rearmost dollies 20 with the support rod 30 affixed thereto are pulled toward the front of the truck box 10. As the rearmost dollies 20 move forwardly in the tracks 15 and 16 the dollies in front thereof are moved also retracting the cover 35 and moving it into a folded position adjacent the front wall 13 of the truck box 10. When a motor 51 is utilized the entire operation of placing the cover 35 over the truck box 10 and/or retracting the same, can be accomplished from within the truck cab in a very short period of time. If the motor 51 is inoperative or eliminated the hand-crank 50 will perform the same operation with only a slight increase of effort on the part of the operator.

Thus, apparatus for positioning a flexible cover over a truck box is disclosed which is extremely efficient to operate and relatively simple to construct and install. Further, the present apparatus is constructed so that the tracks are protected and not easily fouled by foreign material.

What is claimed is:
1. Apparatus for positioning a flexible cover over a truck box and the like comprising:
   (a) first and second generally tubular tracks attached adjacent the upper edge of two opposed longitudinally extending sides of the box, each of said tracks having a generally downwardly opening, longitudinally extending slot therethrough;
   (b) a plurality of movable members mounted within each of said tracks for movement therealong;
   (c) a plurality of support rods extending across the truck box, said support rods having said flexible cover attached thereto;
   (d) connecting means extending through the slots in the tubular tracks and rigidly connecting each end of each of said support rods to one of said movable members;
   (e) flexible endless cable means engaged over pully means adjacent each end of at least one of said tracks and affixed to the end movable member engaged in said one track; and
   (f) means attached to said pulley means for rotating said endless cable and moving the end movable member in said one track whereby said support rods and said flexible cover are stretched over said truck box in one direction and retracted in the other direction.

2. Apparatus for positioning a flexible cover over a truck box as set forth in claim 1 wherein the movable members each include a wheeled dolly.

3. Apparatus for positioning a flexible cover over a truck box as set forth in claim 2, wherein the wheeled dollies each have a plurality of wheels positioned to prevent twisting movements of the support rods attached thereto.

4. Apparatus for positioning a flexible cover over a truck box as set forth in claim 1 wherein the means attached to said pulley means include an electric motor attached to the truck electrical system.

References Cited
UNITED STATES PATENTS

| | | | |
|---|---|---|---|
| 1,263,759 | 4/1918 | Hanaway | 296—105 |
| 3,136,358 | 6/1964 | Madsen | 160—331 |
| 3,298,732 | 1/1967 | Openshaw | 296—100 |

LEO FRIAGLIA, Primary Examiner

R. R. SONG, Assistant Examiner